(12) United States Patent
Hitomi et al.

(10) Patent No.: US 6,399,218 B2
(45) Date of Patent: *Jun. 4, 2002

(54) MECHANICAL ASSEMBLY OF METALS HAVING INCOMPATIBLE IONIZATION ENERGIES

(75) Inventors: Yasuhiro Hitomi, Hashimoto; Ken'ichi Kawasaki, Sakai; Yasushi Nishimura, Izumi, all of (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/768,291

(22) Filed: Jan. 25, 2001

Related U.S. Application Data

(62) Division of application No. 09/206,243, filed on Dec. 7, 1998, now Pat. No. 6,209,816.

(30) Foreign Application Priority Data

| Dec. 10, 1997 | (JP) | 9-340204 |
| Dec. 10, 1997 | (JP) | 9-340205 |
| May 26, 1998 | (JP) | 10-144658 |

(51) Int. Cl.⁷ .................. B32B 15/04; B32B 31/12
(52) U.S. Cl. ............ 428/621; 428/626; 428/457; 428/458; 264/261; 264/262
(58) Field of Search .............. 428/933, 653, 428/649, 685, 659, 660, 469, 457, 626, 624, 625, 621, 629, 458; 242/900, 310, 322; 264/261, 262, 263

(56) References Cited

U.S. PATENT DOCUMENTS

| 2,478,478 A | 8/1949 | Grebe |
| 3,629,091 A | 12/1971 | George |
| 3,830,634 A | 8/1974 | Zaremski et al. |
| 3,848,939 A | * 11/1974 | Pitner .............. 308/236 |
| 5,449,563 A | 9/1995 | Zhang |
| 5,454,628 A | * 10/1995 | Maiworm et al. ........ 301/65 |

FOREIGN PATENT DOCUMENTS

| DE | 2 207 771 | | 8/1973 |
| DE | 43 06 484 C1 | | 4/1994 |
| JP | 57-54281 | * | 3/1982 |
| JP | 63-287096 | * | 11/1988 |
| JP | 05-125567 | * | 5/1993 |
| JP | 5-190023 A | | 7/1993 |
| JP | 10-204665 | * | 8/1998 |
| JP | 10-236101 A | | 9/1998 |
| WO | WO 94/04379 A1 | | 3/1994 |

* cited by examiner

Primary Examiner—John J. Zimmerman
(74) Attorney, Agent, or Firm—Shinjyu Global IP Counselors, LLP

(57) ABSTRACT

Mechanical assembly of magnesium alloy with steel or titanium/titanium alloy parts. Because the two major metal parts in the assembly have incompatible ionization energies, a part made from aluminum or zinc alloy, the ionization energy of which in intermediary between the two, or an electric insulator intervenes to prevent electrolytic corrosion between them. Furthermore, clearances between the two major metal parts, owing for example to manufacturing tolerances, are injected with filler. The mechanical assembly may be employed in human-powered rotary machines such as spinning reels and bicycle components.

14 Claims, 2 Drawing Sheets

MECHANICAL ASSEMBLY OF METALS HAVING INCOMPATIBLE IONIZATION ENERGIES

This is a division of application Ser. No. 09/206,243, filed Dec. 7, 1998, now Pat. No. 6,209,816.

BACKGROUND OF THE INVENTION

1. Technical Field

The present invention relates to mechanical assemblies of metals, and in particular to mechanical assemblies of metal parts having incompatible ionization energies. Mechanical assemblies according to the present invention may be employed in a variety of mechanisms such as fishing reels and bicycle components.

2. Description of Background

Material set forth in U.S. Pat. No. 6,209,816 B1 not included in the present disclosure is herein incorporated by reference thereto. The present disclosure is a rewriting of certain aspects of the disclosure in Pat. No. 6,209,816 B1.

The present invention is directed to building certain machines that require contact of parts made from metals having incompatible ionization energies. If the ionization energies of metals in contact are sufficiently dissimilar, electrolytic corrosion may occur when current flows between them in the presence of an electrolyte such as, for example, saltwater.

Human-powered rotary machines optimally are lightweight for ease of operation and at the same time rigid to withstand over time the irregular stress and strain that human rather than mechanical application of power to the machines entails. Steel, for example, while rigid in having a high modulus of elasticity, is often undesirably heavy for such applications. In addition to lightness of weight and rigidity, reducing bulk is also desirable in manufacturing human-powered rotary machines, so that they are not unwieldy. Manufacturing parts for such machines of synthetic polymers, for example, may require unacceptable bulk in order to achieve sufficient rigidity. In some applications, furthermore, synthetic-polymer manufactured parts lack the desired texture and cannot lend sought-after quality to the appearance.

Aluminum alloys provide desirable texture and high-grade appearance, and have moduli of elasticity higher than synthetic polymers, but lower than steel. Likewise is the case with zinc alloys, titanium and titanium alloys.

Magnesium alloys are lightweight and highly rigid, but of course lack the strength of steel. Employing magnesium alloys in combination with iron or steel in manufacturing machine components can serve to reduce weight while maintaining operatively sufficient strength and rigidity. Iron and steel have ionization energies incompatible with magnesium alloys, to the extent that electrolytic corrosion may occur between them if they are in direct contact and come into the presence of an electrolyte such as saltwater or even air.

SUMMARY OF THE INVENTION

An object of the present invention is to prevent electrolytic corrosion in machine parts manufactured of magnesium alloy and employed in combination with machine parts made of materials having ionization energy incompatible with magnesium alloy.

The present invention in one aspect is a mechanical assembly of a magnesium alloy first part and a second part of another metal coupled to the magnesium alloy part at a clearance therewith, and a filling agent injected into the clearance between the first and second parts.

The second part may be an aluminum or zinc alloy; alternatively, the second part may be titanium or titanium alloys, or stainless steel.

The magnesium alloy first part may be anodized.

Wherein the second part is made of aluminum or zinc alloy, it may be coupled to and in direct contact with a steel part in a mechanical assembly according to the present invention.

The filling agent may be a liquid for injection into the clearances by capillary action. In addition, the filling agent may be a liquified adhesive that solidifies after insertion.

The filling agent improves anti-corrosion properties of the mechanical assembly by acting as an insulator against electrolytic corrosion.

In another aspect, the present invention is a mechanical assembly that includes: a magnesium alloy first part; a lower ionization-energy stainless steel or titanium/titanium alloy second part coupled to the magnesium alloy first part; an insulating material interposed between and in direct contact with the first and second parts; and a filling agent injected into clearances between the first part and the second part or the insulating material.

The insulating material electrically insulates the magnesium alloy from the lower ionization-energy stainless steel or titanium/titanium alloy to make electrolytic corrosion unlikely.

From the following detailed description in conjunction with the accompanying drawings, the foregoing and other objects, features, aspects and advantages of the present invention will become readily apparent to those skilled in the art.

DETAILED DESCRIPTION OF PREFERRED EMBODIMENTS

Embodiment 1

Figure 1:
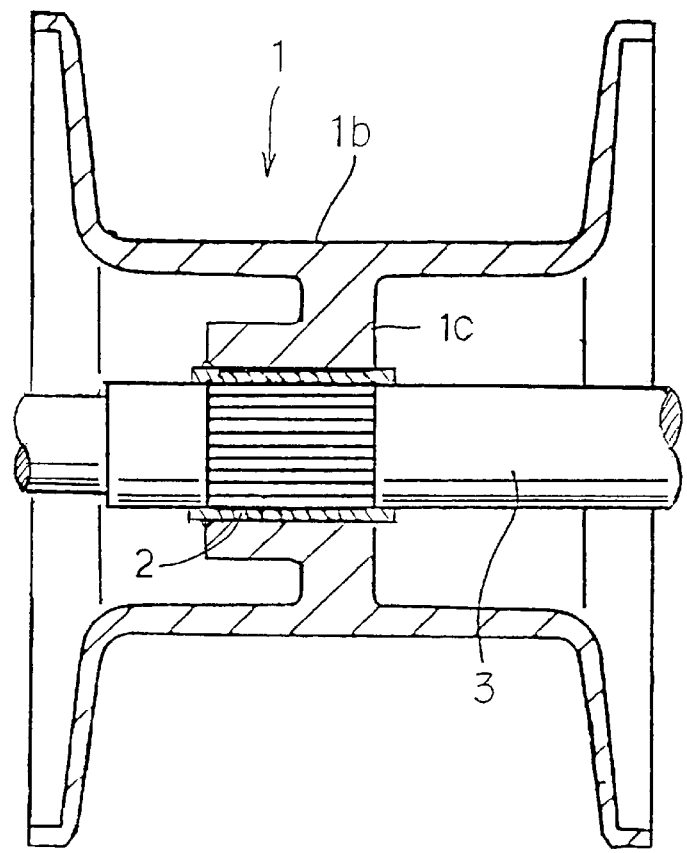
FIG. 1 is a section view of a dual-bearing reel spool mounted on a shaft shown fragmentarily, in one embodiment of the present invention.

The spool 1 depicted in FIG. 1 is manufactured from magnesium alloy by injection molding in a die-casting process. A boss 1c is formed integrally with and centrally along the inner cylindrical surface of a line-winding barrel section 1b of the spool 1. A sleeve 2 made of an aluminum alloy is pressure-inserted into the bore of the boss 1c. Interposition of the sleeve 2 prevents electrolytic corrosion of the magnesium alloy spool 1. The spool 1 is shown serration-coupled to a shaft 3 passing through the sleeve 2. The shaft 3 is a rod of, for instance, a stainless steel.

A slight clearance B exists between the spool 1 and the sleeve 2. An adhesive agent A injected by capillary action fills the clearance B. The liquid filler is not limited to the adhesive agent A, and other liquids, such as synthetic resin polymers and oils may be used so long as the liquid has excellent permeability and anti-corrosion properties.

Figure 2:
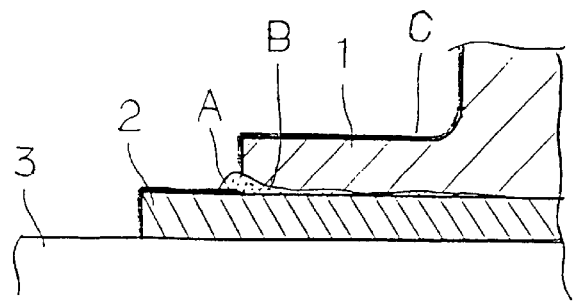
FIG. 2 is an enlarged fragmentary view of a portion of the spool and shaft depicted in FIG. 1.

As further depicted in FIG. 2, an oxide film C is formed on the surfaces of the spool 1 and the sleeve 2 to enhance their anti-corrosion properties. The oxide film C is formed by anodizing, i.e., by an anodic oxidation or conversion coating process.

Disposing the sleeve 2 between the magnesium alloy spool boss 1c and the stainless steel shaft 3 is toward preventing electrolytic corrosion. The ionization energy of the aluminum alloy sleeve 2 is intermediary with respect to the ionization energies of the magnesium alloy spool 1 and the stainless steel shaft 3.

The method of interposing the aluminum alloy part between the magnesium alloy and the steel parts is not limited to pressure insertion; applicable methods include insertion molding. But wherein clearances B remain between, in the present example, the magnesium alloy spool 1 and the aluminum alloy sleeve 2, atmospheric air, salt water or like corrosive fluids acting as electrolytes would be likely to enter the clearances B and lead to corrosion. To eliminate the possibility thus of corrosion, a filler such as the adhesive agent A is filled into the clearance B.

Embodiment 2

Figure 3:
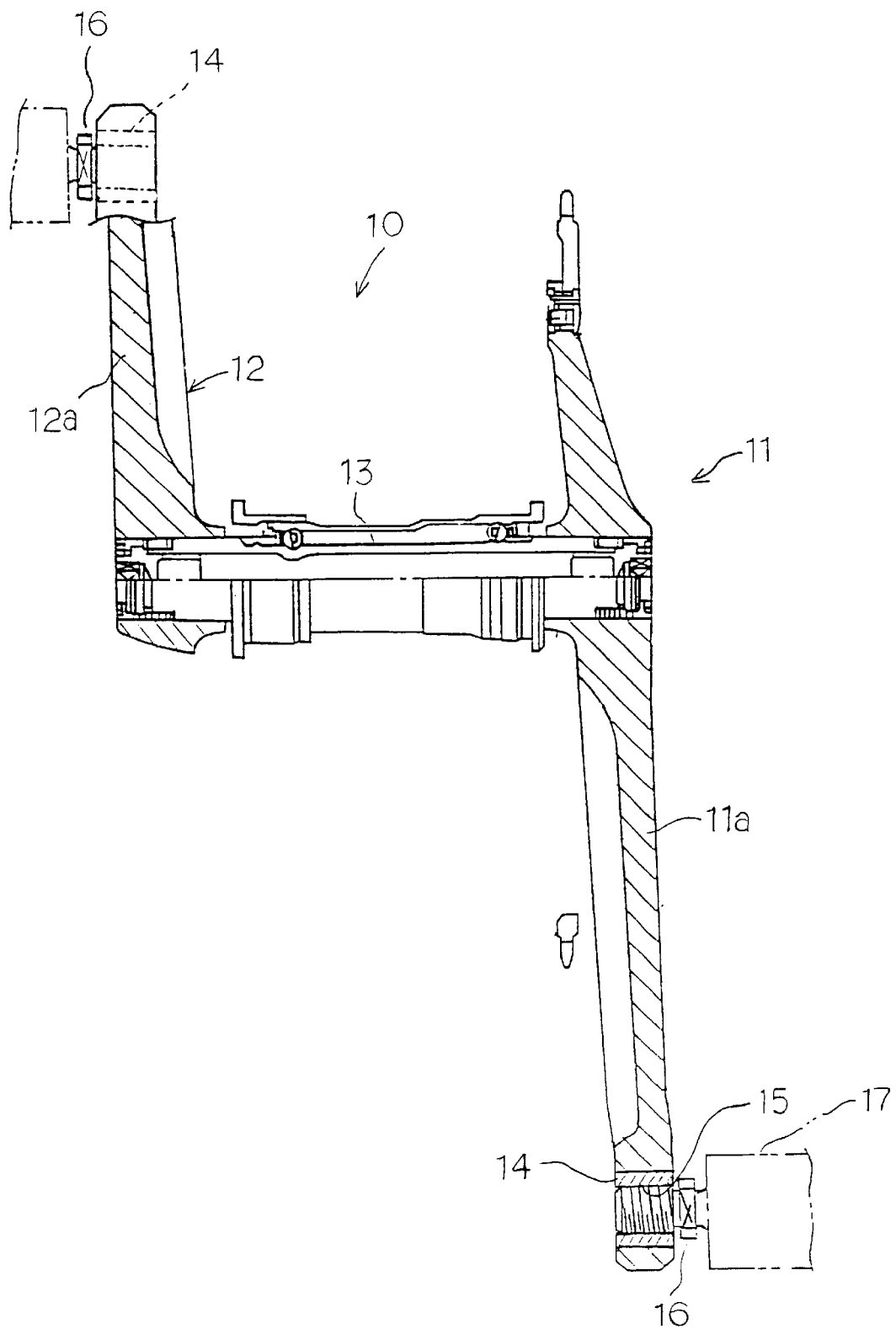
FIG. 3 is a fragmentary partly in section view of a bicycle crank assembly in another embodiment of the invention.

FIG. 3 illustrates a bicycle crank assembly 10 that includes a right and left magnesium-alloy crank arms 11 and 12 fixed to either end of an aluminum alloy crank shaft 13.

An aluminum alloy sleeve 14 having a threaded bore 15 is non-rotatably pressure-inserted into the distal end of a crank portion 11a of the right crank arm 11. A stainless steel pedal shaft 16 for a pedal 17 is screwed into the threaded bore 15 of the sleeve 14.

Likewise, another aluminum-alloy sleeve 14 for another pedal shaft 16 is pressure-inserted into the distal end of a crank portion 12a of the left crank arm 12.

Similarly to the first embodiment, an adhesive agent is filled into clearances between the sleeve 14 and the distal end of the crank portions 11a and 12a.

Further, an oxide film (not indicated) is formed on the surfaces of the right and left crank arms 11, 12.

In the present mechanical assembly of bicycle parts, the magnesium-alloy crank arms 11 and 12 coupled to the stainless steel pedal shafts 16 are not likely to be electrolytically corroded. Further, since the adhesive agent is filled into the clearance between the sleeves 14 and each of the crank portions 11a and 12a, corrosion is not likely to start in the clearances.

Modifications

In the embodiments just described, the magnesium alloy part is in contact with an aluminum alloy part intervening and of intermediate ionization energy between the magnesium alloy part and a stainless steel part. Therein, a zinc alloy part may do instead of the aluminum alloy part.

Other Embodiments

In a mechanical assembly in accordance with the present invention a magnesium alloy part may be directly coupled to a stainless steel, titanium or titanium alloy part, with an insulating material interposed between and in direct contact with the magnesium alloy part and the stainless steel, titanium or titanium alloy part. The insulating material may be a synthetic polymer such as nylon, or may be an insulating paint, for example. Interposing the insulating material between the magnesium alloy part and the stainless steel, titanium or titanium alloy part, reduces flow of electrons between the parts, making electrolytic corrosion of the magnesium alloy part unlikely.

Herein as well, a filling agent is injected into clearances between the parts of the mechanical assembly. That is, filler is filled into clearances between the magnesium alloy part and the stainless steel, titanium or titanium alloy part, as well as between the magnesium alloy part and the insulating material.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A mechanical assembly comprising:
   a magnesium alloy first part; and
   a second part of another metal coupled to the magnesium alloy part at a clearance therewith; and
   an electrolytically insulating filling agent injected into the clearance between said first and second parts.

2. The mechanical assembly as set forth in claim 1, wherein said second part is one selected from the group consisting of aluminum alloys and zinc alloys.

3. The mechanical assembly as set forth in claim 2, wherein said second part is coupled to and in direct contact with a stainless steel part.

4. The mechanical assembly as set forth in claim 1, wherein said second part is one selected from the group consisting of titanium, titanium alloys and stainless steel.

5. The mechanical assembly as set forth in claim 1, wherein said filling agent is a liquid for injection into the clearance by capillary action.

6. The mechanical assembly as set forth in claim 1, wherein said filling agent is a liquified adhesive solidifying after injection into the clearance.

7. The mechanical assembly as set forth in claim 1, wherein said magnesium alloy first part is anodized.

8. A mechanical assembly comprising:
   a magnesium alloy first part;
   a second part coupled to and at a clearance with said magnesium alloy first part, said second part having lower ionization energy than said first part and selected from the group consisting of stainless steel, titanium and titanium alloys;
   an insulating material interposed between, in direct contact and at a clearance with said first and second parts; and
   a filling agent injected into the clearances between said first and second parts, and between said first part and said insulating material.

9. A method for assembling a mechanical assembly comprising:

coupling a magnesium alloy first part and a second part of another metal such that there is a clearance therebetween;

injecting an electrolytically insulating filling agent into the clearance between said first and second parts.

10. The method of claim 9 further comprising:

selecting said second part from the group consisting of aluminum alloys and zinc alloys.

11. The method of claim 9 further comprising:

selecting said second part from the group consisting of titanium, titanium alloys, and stainless steel.

12. The method of claim 9 further comprising:

selecting a liquid filling agent for injection into the clearance by capillary action.

13. The method of claim 9 further comprising:

selecting a liquid adhesive filling agent that solidifies after injection into the clearance.

14. The method of claim 9 further comprising:

anodizing said magnesium alloy first part.

* * * * *